United States Patent [19]
Irwin et al.

[11] Patent Number: 6,155,038
[45] Date of Patent: Dec. 5, 2000

[54] METHOD AND APPARATUS FOR USE IN CONTROL AND COMPENSATION OF CLEARANCES IN A GAS TURBINE

[75] Inventors: Craig W. Irwin, Jupiter; Syed J. Khalid, Palm Beach Gardens, both of Fla.

[73] Assignee: United Technologies Corporation, Hartford, Conn.

[21] Appl. No.: 09/219,912

[22] Filed: Dec. 23, 1998

[51] Int. Cl.⁷ .................................................... F02C 13/10
[52] U.S. Cl. .......................... 60/39.02; 415/17; 415/26; 415/30; 415/33; 415/47; 415/48; 364/431.01; 364/43.02
[58] Field of Search .............................. 60/39.02, 39.091, 60/223; 415/17, 26, 30, 33, 47, 48, 49; 364/431.01, 431.02

[56] References Cited

U.S. PATENT DOCUMENTS

| | | | |
|---|---|---|---|
| 3,614,253 | 10/1971 | Gaertner | 415/23 |
| 4,338,061 | 7/1982 | Beitler et al. | 415/1 |
| 4,849,895 | 7/1989 | Kervistin | 364/431.02 |
| 4,958,289 | 9/1990 | Sum et al. | 364/431.01 |
| 4,995,786 | 2/1991 | Wheeler et al. | 415/148 |
| 5,012,420 | 4/1991 | Walker et al. | 364/431 |
| 5,165,844 | 11/1992 | Khalid | 415/17 |
| 5,165,845 | 11/1992 | Khalid | 415/17 |

*Primary Examiner*—Charles C. Freay

[57] ABSTRACT

A method and an apparatus for use with a gas turbine engine receive a signal indicative of an engine operating condition, generate signals representative of thermal conditions of a rotor, blades, and a case, and in response to each of the signals above, determine a signal indicative of a difference between a instantaneous clearance for the thermal conditions and a steady state clearance for the engine operating condition. The determination includes effects related to a temporary difference that results from a difference between the steady state clearance for the engine operating condition and a steady state clearance for a preceding engine operating condition, but does not require computation of the actual temperatures or the steady state temperatures of the rotor, the blades, and the case. A signal indicative of the difference between a instantaneous clearance for the thermal conditions and a steady state clearance for the engine operating condition may be provided to various augmentation schedules.

18 Claims, 6 Drawing Sheets

METHOD AND APPARATUS FOR USE IN CONTROL AND COMPENSATION OF CLEARANCES IN A GAS TURBINE

DESCRIPTION

The U.S. Government has rights relating to this invention pursuant to Air Force Contract F33657-91-C-0007.

RELATED APPLICATIONS

The subject matter herein may be disclosed and/or claimed in U.S. patent application entitled "METHOD AND APPARATUS FOR USE IN CONTROL OF CLEARANCES IN A GAS TURBINE ENGINE", attorney docket number F-8041.

TECHNICAL FIELD

The present invention relates to control and compensation of clearances between rotor assemblies and cases in a gas turbine engine, and more particularly to control and compensation of clearances during thermal non-equilibrium conditions.

BACKGROUND OF THE INVENTION

A gas turbine engine has a number of rotor assemblies. Each rotor assembly has a plurality of rotor stages having a plurality of rotating blades. The blades are surrounded by a case. The blades and the case are separated by a clearance. The clearance between the blades and the case is a critical factor in the performance of the engine. Too small of a clearance results in rubbing between the blades and the case, and thereby reduces engine efficiency and engine life. Too large of a clearance reduces engine efficiency, and in a compressor, can lead to a compressor stall condition.

It is desirable to be able to determine the magnitude of the clearance in order to control the clearance or compensate for clearances that are too large or too small. Methods presently exist to adequately determine a steady state clearance for an engine operating condition, i.e., the clearance that exists when the rotor, the blades, and the case are at a thermal equilibrium condition. However, some gas turbine engines undergo a wide range of operating conditions. A transition from one operating condition to another operating condition introduces a thermal non-equilibrium condition in the rotor, the blades, and the case. The clearance during the thermal non-equilibrium condition can be significantly larger or significantly smaller than the steady state clearance for the engine operating condition. This difference can persist until the rotor, the blades, and the case each reach the thermal equilibrium condition for the engine operating condition. Thus, methods are needed to adequately determine the clearance during thermal non-equilibrium conditions as well.

U.S. Pat. No. 5,012,420 discloses a system to calculate the instantaneous clearance between a turbine casing and a turbine rotor based on temperature. Steady state temperatures for the casing and the rotor are computed based on presently occurring engine operating conditions such as selected temperatures, pressures, and rotational speeds. Instantaneous temperatures are computed based on changes in the steady state temperatures. The system calculates the instantaneous clearance during steady state and non-steady state conditions. However, the need to calculate the steady state temperatures and the instantaneous temperatures of the casing and the rotor makes this system complex and therefore difficult to a particular gas turbine engine.

U.S. Pat. No. 5,165,845 discloses a system for controlling stall margin by synthesizing the thermal enlargement of critical compressor stages to synthesize the temporary increase in blade-case clearance during acceleration. This system does not require calculation of the steady state temperatures or the instantaneous temperatures of the rotor, the blade, and the case. However, the synthesis of the temporary increase blade-case clearance does not include effects related to a temporary difference that results from a difference between the steady state clearance before the acceleration and the steady state clearance after the acceleration. Consequently, this system can be difficult to adapt from one type of gas turbine engine to another type of gas turbine engine. In addition, this system has limited flexibility with respect to representing thermal expansion characteristics of the rotor, the blade, and the case.

DISCLOSURE OF THE INVENTION

An object of this invention is to provide a method and apparatus that determines the difference between the instantaneous clearance and the steady state clearance for an engine operating condition, including effects related to the temporary difference that results from a difference between the steady state clearance for the engine operating condition and a steady state clearance for a preceding engine operating condition, without the need to determine the instantaneous temperatures or the expected steady state temperatures of the rotor assembly and the case.

The present invention is predicated, in part, on the recognition that the difference between the instantaneous clearance and the steady state clearance for an engine operating condition can be determined based on an indication of the engine operating condition and thermal conditions determined therefrom, so as to include effects related to the temporary difference that results from a difference between the steady state clearance for the engine operating condition and a steady state clearance for a preceding engine operating condition, without the need to determine the instantaneous temperatures or the expected steady state temperatures of the rotor assembly and the case.

According to the present invention, a method and an apparatus for use with a gas turbine engine having a rotor assembly and a case separated by a clearance, receives a signal indicative of an engine operating condition, generates in response thereto, signals representative of thermal conditions of the rotor assembly and the case, and in response to each of the signals above, generates a signal indicative of a difference between the instantaneous clearance for the thermal conditions and a steady state clearance for the engine operating condition.

This invention determines the difference between the instantaneous clearance and the steady state clearance on the basis of a signal indicative of the engine operating condition. The determination includes effects related to the temporary difference that results from a difference between the steady state clearance for the engine operating condition and a steady state clearance for a preceding engine operating condition. However, the invention does not require computation of the actual temperatures or the steady state temperatures of the rotor assembly and the case. Consequently, the invention is adaptable with reasonable accuracy, to various types of gas turbine engines. In a detailed embodiment, the invention provides the ability to represent the thermal expansion of the rotor, the blades and the case including characteristics related to the structures and/or the materials of the rotor, the blades and the case. In such detailed embodiment, the invention has the flexibility to be finely tuned to the engine based on measurements of the instantaneous clearance during engine testing. The signal indicative of the engine operating condition may be indicative of a working medium gas temperature. The invention may be used to control the clearance and/or to compensate for excessively large or excessively small clearances.

These and other objects, features and advantages of the present invention will become more apparent in the light of the following detailed description, accompanying drawings, and claims.

BEST MODE EMBODIMENT

Figures 1, 2, 5:
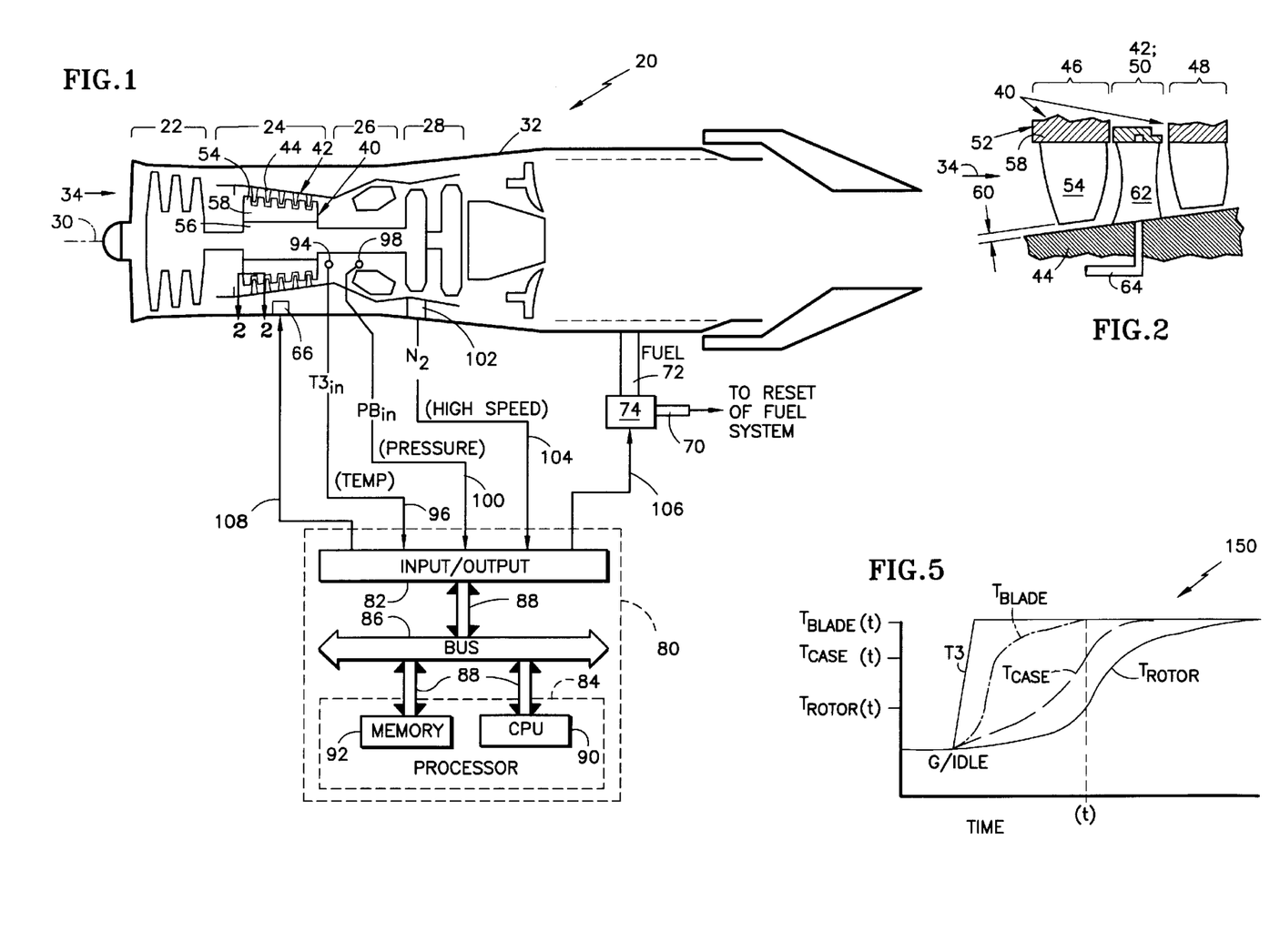
FIG. 1 is a schematic representation of a gas turbine engine in combination with a block diagram representation of an engine controller to control the gas turbine engine.
FIG. 2 is an enlarged cross section view, in a direction of 2—2 of FIG. 1, of a portion of a compressor section of the gas turbine engine of FIG. 1.
FIG. 5 is a graph illustrating magnitudes of signals generated by the engine control portion of FIG. 4, before, during and after the rapid transition of FIG. 3.

The present invention is disclosed with respect to an embodiment for use with a gas turbine engine of the type illustrated in FIG. 1. Referring now to FIG. 1, a gas turbine engine 20 includes a fan section 22, a compressor section 24, a combustor section 26, and a turbine section 28 disposed along a longitudinal axis 30 and enclosed in an outer engine case 32. The gas turbine engine 20 has a flow path 34 for working medium gases. The flow path 34 extends through the sections of the engine 20.

The compressor section 24 includes a rotor assembly 40 and a stator assembly 42 enclosed within a case 44. Referring now to FIG. 2, in a cross section view of a portion of the compressor section 24, the rotor assembly 40 comprises a plurality of rotor stages, represented by a rotor stage 46 and a rotor stage 48. The stator assembly 42 has a plurality of vane stages, represented by a vane stage 50, alternatingly disposed between the rotor stages 46, 48. Each rotor stage has a rotor 52 and blades 54. The rotor 52 includes a disk 56 (FIG. 1) and a rim 58. The blades 54 are circumferentially spaced about and attached to the rim 58. The blades 54 and the case 44 are spaced apart thereby defining a clearance 60. The disk 56 and the rim 58 may comprise a nickel alloy material. The blades 54 may comprise a titanium or a nickel alloy material. The case 44 may comprise a titanium or a nickel alloy material.

Each of the vane stages 50 has a plurality of movable vanes, represented by a vane 62, that control airflow to the blades 54. The vanes 62 in the vane stages 50 are moved by control arms, represented by a control arm 64. U.S. Pat. No. 4,995,786 shows vanes and a control arm for moving the vanes, similar to the vanes 62 and the control arm 64. The control arms 64 are driven by a stator assembly actuator 66 (FIG. 1).

Referring again to FIG. 1, the gas turbine engine 20 receives fuel from a fuel system, represented in part by a first fuel line 70, a second fuel line 72, and a fuel control valve 74. The first fuel line 70 connects from a fuel supply (not shown) to the fuel control valve 74. The second fuel line 72 connects from the fuel control valve 74 to the combustor section 26 of the gas turbine engine 20. The fuel control valve 74 regulates the rate at which the fuel flows into the engine 20.

An engine controller 80 includes an input/output (I/O) portion 82, a processor portion 84 and a bus portion 86 with connections 88 to each of the other portions of the engine controller 80. The processor portion 84 includes a CPU portion 90 and a memory portion 92. The processor further includes a program stored in the memory portion 92. The program comprises a series of modules in software or firmware having a series of instructions or steps to be executed by the CPU portion 90. The program is described in further detail hereinbelow with respect to FIG. 6.

The engine controller 80 receives signals from various sensors on the gas turbine engine 20. A temperature sensor 94 provides a signal, $T3_{in}$, on signal line 96, indicative of the temperature of the working medium gas at a downstream end of the compressor 24. A pressure sensor 98 provides a signal, $PB_{in}$, on signal line 100, indicative of the static pressure in the combustor section 26. A speed sensor 102 provides a signal, N2, on signal line 104 indicative of the rotational speed of the rotor assembly 40.

The engine controller 80 provides a control signal to the fuel control valve 74 via a signal line 106. The control signal is indicative of a desired rate of fuel flow to the gas turbine engine 20. The engine controller 80 further provides a control signal to the stator assembly actuator 66 via a signal line 108. The control signal is indicative of a position desired for the vanes 62 of the stator assembly 42.

The clearance 60 (FIG. 2) between the rotor assembly 40 and the case 44 depends on the temperature of the rotor assembly 40 and the temperature of the case 44. Increases in the temperature of the rotor assembly 40 and the temperature of the case 44 cause the rotor assembly 40 and the case 44 to expand radially. Radial expansion of the rotor assembly 40 contributes to a decrease in the clearance 60. Radial expansion of the case 44 contributes to an increase in the clearance 60.

The steady-state temperatures of the rotor assembly 40 and the case 44 depend on the steady-state temperature of the working medium gases, which in turn depends on the engine operating condition. The clearance 60 expected when the rotor assembly 40 and the case 44 are at their steady state temperatures for an engine operating condition (i.e., at a thermal equilibrium condition for an engine operating condition) is referred to herein as the steady state clearance for the engine operating condition. Unless the rotor assembly 40 and the case 44 are at thermal equilibrium, there is a difference between the instantaneous clearance 60 (FIG. 2) and the steady-state clearance.

Figure 3:
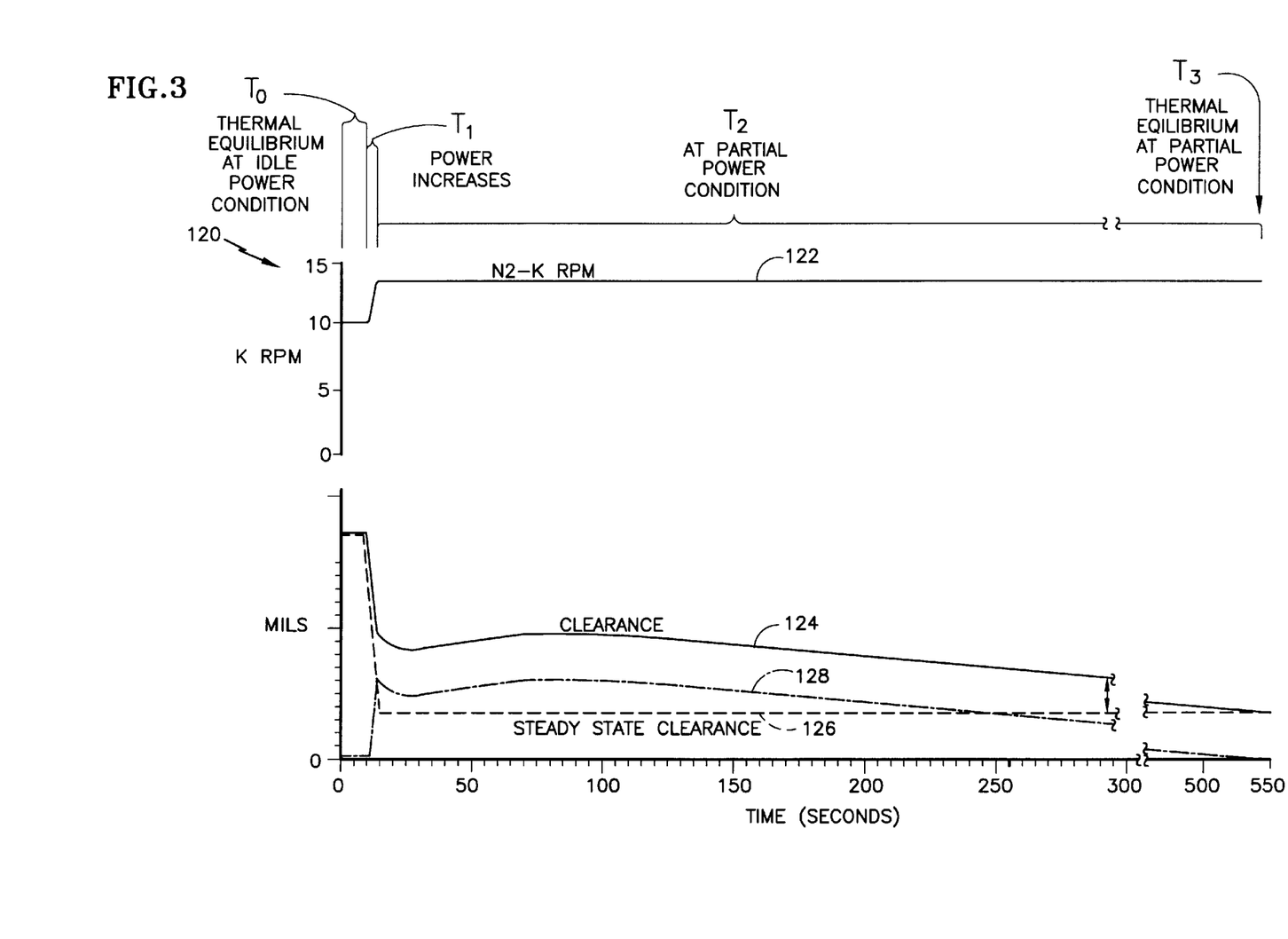
FIG. 3 is a graph illustrating the magnitudes of various engine parameters before, during and after a rapid transition from an idle engine operating condition to a partial power engine operating condition.

Referring now to FIG. 3, a graph 120 has four curves indicative of engine parameters before, during and after a rapid transition from an idle power engine operating condition to a partial power engine operating condition. A first curve 122 is indicative of the magnitude of the N2 speed signal. A second curve 124 is indicative of the magnitude of the instantaneous clearance 60 (FIG. 2). A third curve 126 is indicative of the steady state clearance. A fourth curve 128 is indicative of the difference between the instantaneous clearance (the second curve 124) and the steady state clearance (the third curve 126). In an initial interval $T_0$, the engine is at the idle engine operating condition and the rotor assembly 40 and the case 44 are at thermal equilibrium. Throughout this interval, the instantaneous clearance is equal to the steady-state clearance. In an interval $T_1$, the engine power rapidly increases from the idle engine operating condition to the partial power engine operating condition. The increase results in an increase in the rotational speed of the rotor assembly 40 (as indicated by the first curve 122), which causes radial expansion of the rotor assembly 40, and thereby results in a decrease in the instantaneous clearance and the steady-state clearance (as indicated by the second curve 124 and the third curve 126, respectively). In addition, the increase in the engine power causes an increase to the temperature of the working medium gases and thereby causes an increase in the steady state temperatures of the rotor assembly 40 and the case 44. The increase in the steady state temperatures causes a steady state thermal expansion of the rotor assembly and a steady state thermal expansion of the case. A mismatch between the steady state thermal expansion of the rotor assembly 40 and the steady state thermal expansion of the case 44 results in a decrease in the steady state clearance (as indicated by the third curve 126) relative to that of the steady state clearance for the idle engine operating condition. Because the instantaneous clearance (as indicated by the second curve 124) reflects the existing temperatures of the rotor assembly and the case, and because the temperatures of the rotor assembly and the case cannot change instantaneously, a difference (as indicated by the fourth curve 128) develops between the instantaneous clearance and the steady state clearance. In an interval $T_2$, the engine power remains constant at the partial power engine operating condition. The temperature of the working medium gases reaches steady state within a few seconds. The temperature of the rotor assembly 40 and the temperature of the case 44 eventually reach steady state at $T_3$, at which point the instantaneous clearance is again equal to the steady-state clearance.

The difference between the instantaneous clearance and the steady state clearance may be further explained as follows. During the interval $T_1$, the difference between the instantaneous clearance and the steady state clearance is primarily a function of a mismatch between the steady state thermal expansion of the rotor 52 and the steady state thermal expansion of the case 44, combined with the fact that the rotor 52 and the case 44 require a significant amount of time to thermally stabilize. The difference is, to a lesser extent, a function of the thermal time constant and thermal expansion of the blade. The blade is not a large contributor to the thermal expansion of the rotor assembly 40, but the blade heats (and cools) rapidly enough to thermally expand during the rapid transition in the engine operating condition. With respect to the interval $T_2$, the difference between the instantaneous clearance and the steady state clearance over the first five to ten seconds of the $T_2$ interval is primarily a function of the thermal time constant and the thermal expansion of the blade. The difference between the instantaneous clearance and the steady state clearance over these five to ten seconds is, to a lesser extent, a function of the thermal time constant and the thermal expansion of the case 44 as it begins to heat up. The difference between the instantaneous clearance and the steady state clearance over the next 30–120 seconds or so, is primarily driven by a mismatch between the thermal time constant of the case 44 and the thermal time constant of the rotor 52 as well as the mismatch between the steady state thermal expansion of the rotor 52 and the steady state thermal expansion of the case 44. This is because the rotor 52 and the case 44 heat up at different rates, and because, as stated above, the rotor 52 and the case 44 do not expand the same amount as each other. The difference between the instantaneous clearance and the steady state clearance over the final 200 to 500 seconds is a function of the thermal time constant and the thermal expansion of the rotor 52, as by this time both the blade and the case 44 are already at their steady state temperature and their steady state thermal expansion (i.e., fully heated and thermally expanded).

It has been determined that the difference between the instantaneous clearance 60 and the steady state clearance can be determined without the need to calculate the steady state temperatures or the instantaneous temperatures of the rotor assembly 40 and the case 44. To this effect, and in view of the description below, it will be understood that the best mode embodiment of the present invention receives a signal indicative of the engine operating condition. The signal is preferably that of a working medium gas temperature at a location proximate to the rotor, blades, and case of interest. The working medium gas temperature is used to represent the steady state thermal conditions of the rotor 52, the blades 54, and the case 44 for the engine operating condition. The working medium gas temperature is further used to generate signals representing the thermal conditions of the rotor 52, the blades 54, and the case 44. Signals representative of coefficients of thermal expansion of the rotor, the blades, and the case, relate the thermal conditions and the steady state thermal conditions to thermal expansions of the rotor, the blades, and the case. The difference between the instantaneous clearance and the steady state clearance is determined as a function of the thermal expansions of the rotor, blades, and case at the thermal conditions and the thermal expansions of the rotor, the blades, and the case at the steady state thermal conditions.

Figure 4:
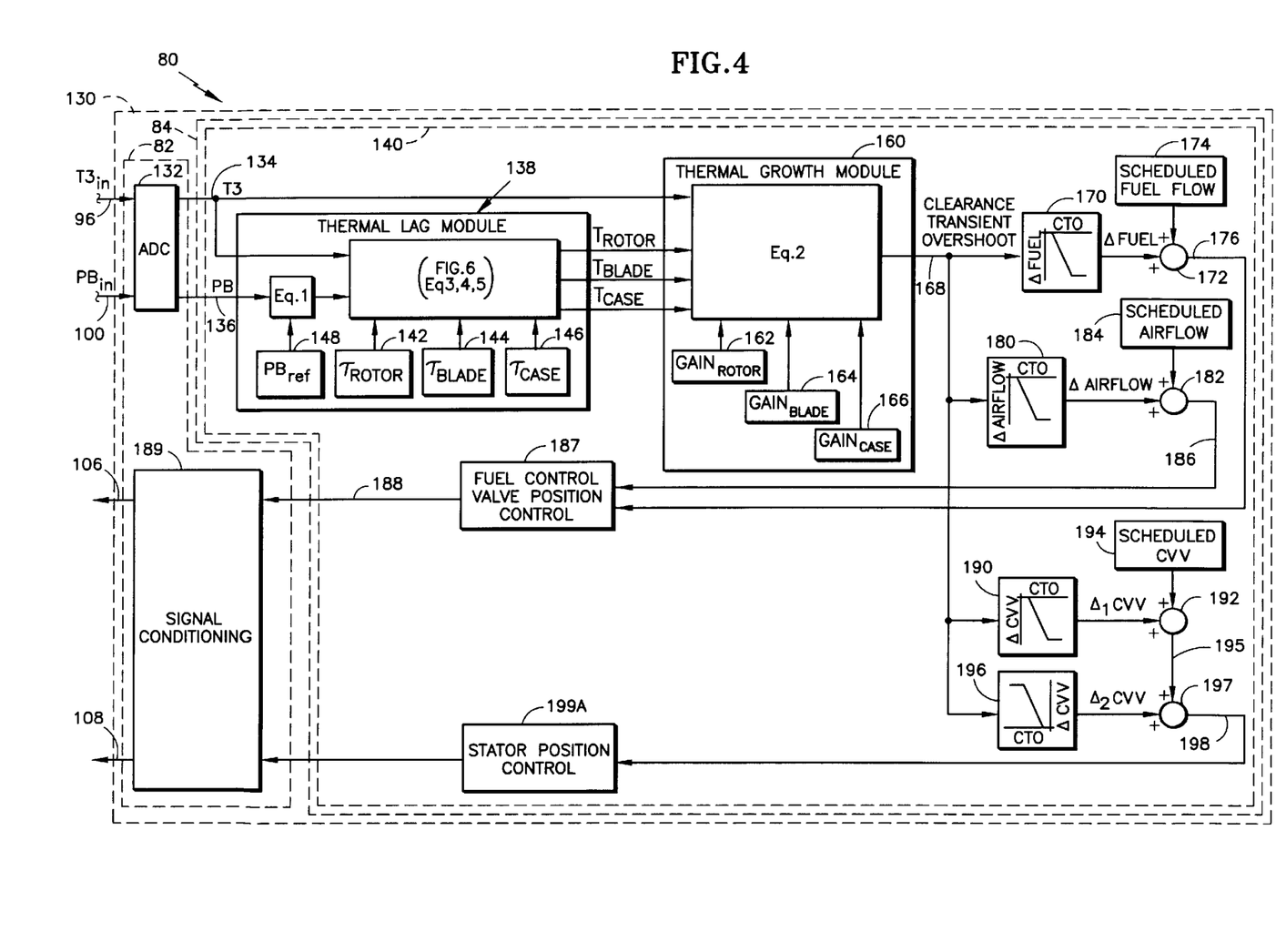
FIG. 4 is a functional block diagram illustrating a portion of the engine control of FIG. 1 used to synthesize a clearance transient overshoot signal.

Referring now to FIG. 4, in a functional block diagram of a portion of the engine controller 80, the engine controller 80 has a portion 130 that determines the difference between the instantaneous clearance 60 and the steady state clearance for three rear (i.e., downstream most) rotor stages of the compressor section 24 (FIG. 1). The portion may, in addition, initiate control actions to compensate for a instantaneous clearance 60 that is excessively larger or excessively smaller than the steady-state clearance. The temperature of the working medium gas at the downstream end of the compressor section 24, as indicated by the T3 signal, is chosen as the representative working medium gas temperature. As stated above, the representative working medium gas temperature represents the thermal conditions of the rotor, the blades, and the case at steady state (i.e., thermal equilibrium) for the engine operating condition.

The portion includes an analog-to-digital converter (ADC) circuit 132 in the I/O portion 82 of the engine controller 80. The ADC circuit 132 receives the $T3_{in}$ on signal line 96 and receives the $PB_{in}$ signal on signal line 100. The ADC circuit 132 performs analog to digital signal conversions to provide a digital signal, T3, indicative of the magnitude of the $T3_{in}$ signal. The ADC circuit 132 performs further analog to digital signal conversions to provide a digital signal, PB, indicative of the magnitude of the $PB_{in}$ signal. The analog to digital signal conversions are preferably performed at a substantially periodic rate, e.g., 20 conversions per second per signal.

The T3 signal and the PB signals are provided via signal lines 134, 136 to a thermal lag module 138 in a portion of the program 140 stored and executed in the processor portion 84 of the engine controller 80. To determine the thermal conditions of the rotor, the blades, and the case, the thermal lag module includes a $\pi_{ROTOR}$ signal 142, a $\pi_{BLADE}$ signal 144, and $\pi_{CASE}$ signal 146 representative of thermal time constants of the rotor 52, the blades 54, and the case 44 respectively. However, it is known that the rate at which the rotor 52, the blades 54, and the case 44 heat and cool depends on the pressure in the combustor section 28. Consequently, to compensate the thermal time constants for variations in combustor pressure, the thermal lag module generates a thermal time constant scale factor signal, R, having a magnitude computed as a function of the PB signal and a signal, $PB_{ref}$ 148, in accordance with equation (1)

$$R = (PB_{ref}/PB)^{0.5} \qquad (Eq. 1)$$

The exponential value in equation (1) need not be equal to 0.5, but rather is determined empirically and is typically in a range between 0.4 and 0.6.

In a manner further described hereinbelow with respect to FIG. 6, the thermal lag module generates three signals: $T_{ROTOR}$, $T_{BLADE}$, and $T_{CASE}$, representative of the thermal conditions of the rotor 52, the blades 54, and the case 44, respectively. Referring also now to FIG. 5, a graph 150 has four curves: a curve T3, a curve $T_{ROTOR}$, a curve $T_{BLADE}$, and a curve $T_{CASE}$. The curve T3 is indicative of the magnitude of the T3 signal before during and after the rapid transition from the idle engine operating condition to the partial power engine operating condition described with respect to FIG. 3. The curves $T_{ROTOR}$, $T_{BLADE}$, and $T_{CASE}$ are indicative of the magnitudes of the $T_{ROTOR}$, the $T_{BLADE}$, and the $T_{CASE}$ signals, respectively, generated by the thermal lag module in response to the T3 signal magnitude indicated by the curve T3. Note that if the engine operating condition remains constant, then the magnitudes of the $T_{ROTOR}$, the $T_{BLADE}$, and the $T_{CASE}$ signals each eventually equal the magnitude of the T3 signal, thereby indicating that the rotor, the blades, and the case are at steady state thermal conditions (i.e., thermally stabilized).

The T3 signal, the $T_{ROTOR}$ signal, the $T_{BLADE}$ signal, and the $T_{CASE}$ signal, are provided to a thermal growth module 160. The thermal growth module 160 has signals, $GAIN_{ROTOR}$ 162, $GAIN_{BLADE}$ 164 and $GAIN_{CASE}$ 166, which represent coefficients of thermal expansion of the rotor 52, blades 54, and case 44, respectively. In particular, the $GAIN_{ROTOR}$ signal 162, the $GAIN_{BLADE}$ signal 164, and the $GAIN_{CASE}$ signal 166 relate the thermal conditions represented by the T3, the $T_{ROTOR}$, the $T_{BLADE}$, and the $T_{CASE}$ signals to thermal expansions of the $T_{ROTOR}$, the $T_{BLADE}$, and the $T_{CASE}$, respectively. The $GAIN_{ROTOR}$ signal 162, the $GAIN_{BLADE}$ signal 164, and the $GAIN_{CASE}$ signal 166 are preferably reasonably accurate representations of the characteristics of thermal expansion of the rotor 52, the blade and the case 44 including characteristics related to the structures and/or the materials of the rotor 52, the blades 54 and the case 44.

The thermal growth module generates a signal, clearance transient overshoot, indicative of the difference between the instantaneous clearance 60 for the thermal conditions represented by the $T_{ROTOR}$, the $T_{BLADE}$, and the $T_{CASE}$ signals, and the steady-state clearance for the engine operating condition. As stated above, the steady state clearance is the clearance expected when the rotor 52, the blades 54, and the case 44 are at their steady state temperatures for the engine operating condition. As stated above, the thermal conditions of the rotor, the blades, and the case at steady state for the engine operating condition are represented by the magnitude of the T3 signal. The clearance transient overshoot signal has a magnitude computed in accordance with equation 2.

$$\text{clearance transient overshoot} = GAIN_{ROTOR}(T3 - T_{ROTOR}) + \qquad (Eq. 2)$$
$$GAIN_{BLADE}(T3 - T_{BLADE}) - GAIN_{CASE}(T3 - T_{CASE})$$

The term $GAIN_{ROTOR}$ (T3–$T_{ROTOR}$) represents a difference between the thermal expansion of the rotor 52 at steady state and the thermal expansion of the rotor 52 at the thermal condition represented by the $T_{ROTOR}$ signal. The term $GAIN_{BLADE}$ (T3–$T_{BLADE}$) represents a difference between the thermal expansion of the blades 54 at steady state and the thermal expansion of the blades 54 at the thermal condition represented by the $T_{BLADE}$ signal. The term $GAIN_{CASE}$ (T3–$T_{CASE}$) represents a difference between the thermal expansion of the case 44 at steady state and the thermal expansion of the case 44 at the thermal condition represented by the $T_{CASE}$ signal.

The clearance transient overshoot signal may be provided to various augmentation schedules via signal line 168. For example, a first augmentation schedule 170 receives the clearance transient overshoot signal and generates a signal, $\Delta$ fuel. The $\Delta$ fuel signal is provided to an adder 172, which adds the $\Delta$ fuel signal and a scheduled fuel flow signal 174 to generate an augmented scheduled fuel flow signal on a signal line 176. When the clearance transient overshoot has a large positive magnitude, the $\Delta$ fuel signal has a magnitude that, in effect, reduces engine acceleration.

A second augmentation schedule 180 receives the clearance transient overshoot signal and generates a signal, $\Delta$ airflow. The $\Delta$ airflow signal is provided to an adder 182, which adds the $\Delta$ airflow signal and a scheduled airflow signal 184 to generate an augmented scheduled airflow signal on a signal line 186. When the clearance transient overshoot has a large positive magnitude, the $\Delta$ airflow signal has a magnitude that, in effect, reduces the scheduled airflow. In operation, the engine controller 80 commands the flow control valve to provide a fuel flow rate that is intended to result in the scheduled airflow. Thus, reducing the scheduled airflow when the clearance transient overshoot is large reduces the likelihood that the engine controller will command an excessive fuel flow rate in an attempt to achieve an airflow that is, under the circumstances, too high. An excessive fuel flow rate can cause excessive temperatures inside the engine. Consequently, the second augmentation schedule 180 has the effect of limiting thrust during thermal non-equilibrium in order to reduce the likelihood of causing excessive engine temperatures. The signal on the signal line 176 and the signal on the signal line 186 are provided to a fuel control valve position control module 187, which generates a signal on a signal line 188 indicative of a desired fuel flow rate. The signal on signal line 188 is provided to a signal conditioning 189 circuit in the I/O portion 82 of the engine controller 80. The signal conditioning circuit 189 in turn generates the control signal provided to the fuel control valve 74 (FIG. 1) through the signal line 106.

A third augmentation schedule 190 receives the clearance transient overshoot signal and generates a signal, $\Delta_1 CVV$. The $\Delta_1 CVV$ signal is provided to an adder 192, which adds the $\Delta_1 CVV$ to a scheduled compressor variable vanes (CVV) control signal 194 to generate a signal on a signal line 195. When the clearance transient overshoot signal is large, the $\Delta_1$CVV signal has a magnitude that, in effect, causes the variable vanes to close. A fourth augmentation schedule 196 receives the clearance transient overshoot signal and generates a signal $\Delta_2$CVV. The $\Delta_2$CVV signal is provided to an adder 197 which adds the $\Delta_2$CVV signal to the signal on the signal line 195 to generate an augmented scheduled CVV control signal on signal line 198. When the clearance transient overshoot has a negative magnitude that indicates a rub is probable, the $\Delta_2$CVV signal has a magnitude, that in effect, causes the variable vanes to open, thereby causing the rotational speed of the rotor assembly 40 to decrease and causing the clearance 60 to increase. The signal on the signal line 198 is provided to a stator position control module 199A, which generates a signal on a signal line 199B indicative of a desired position for the vanes 62 (FIG. 2) of the stator assembly 42 (FIGS. 1, 2). The signal on signal line 199B is provided to the signal conditioning 189 circuit in the I/O portion 82 of the engine controller 80. The signal conditioning circuit 189 in turn generates the control signal provided to the stator assembly actuator 66 (FIG. 1) via the signal line 108.

Figure 6:
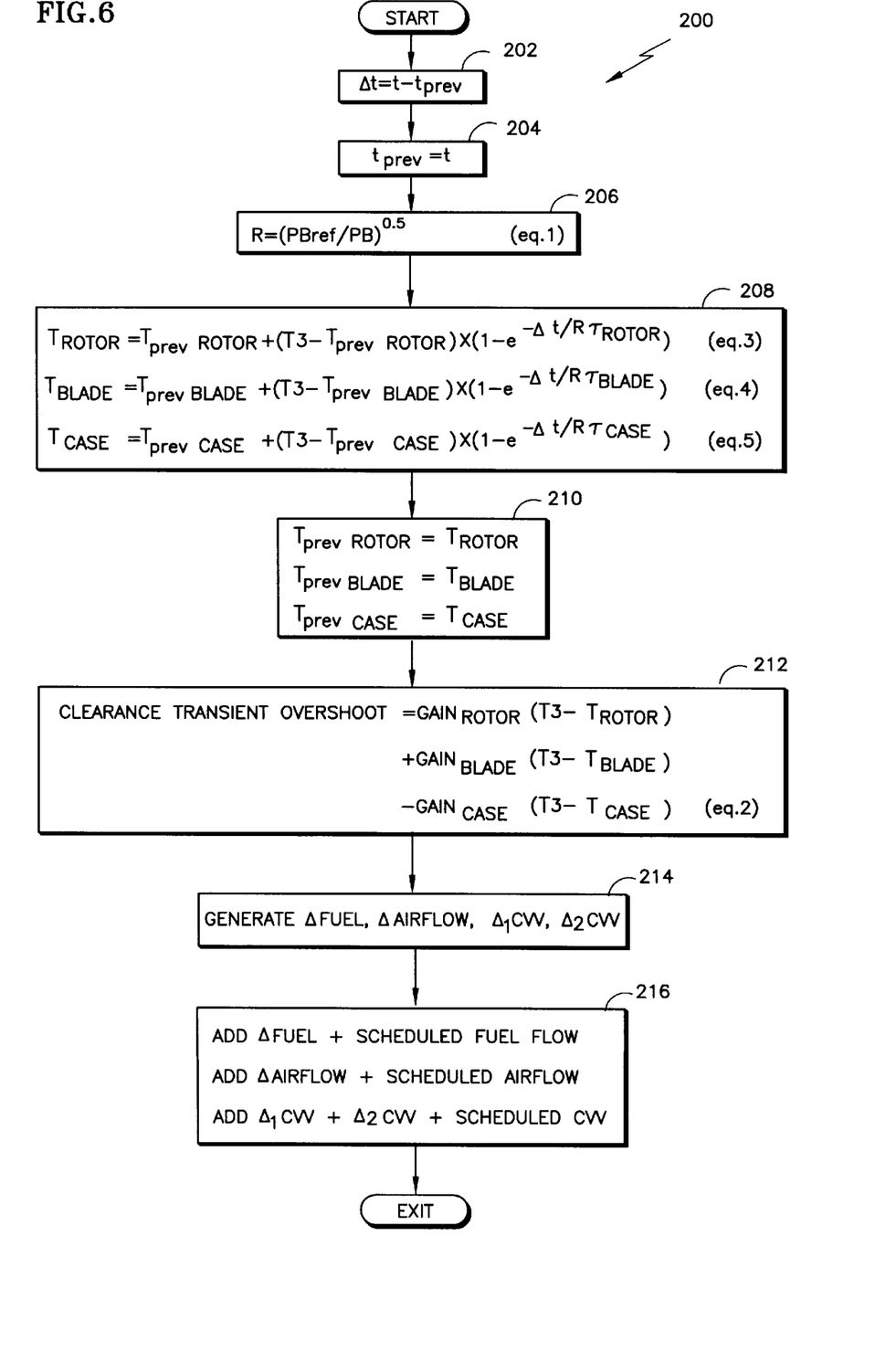
FIG. 6 is a flowchart of steps in a portion of a program in the engine control of FIG. 1 used to generate the clearance transient overshoot signal of FIG. 4.

Referring now to FIG. 6, a flowchart 200 illustrates steps in the portion of the program 140 used to generate the clearance transient overshoot signal. Generation of the clearance transient overshoot signal is effected incrementally by execution of the portion of the program 140, preferably at a substantially constant rate. The rate may be based upon the required accuracy and the available computing time and may be approximately 20 Hertz. In an initial step 202, the processor generates a $\Delta t$ signal having a magnitude equal to the difference between a present time t and a previous time $t_{prev}$. At a step 204, the previous time $t_{prev}$ is updated to equal the magnitude of the present time t. At a step 206, the processor calculates the magnitude of the thermal time constant scaling factor signal R according equation (1).

At a step 208, the processor generates the $T_{ROTOR}$ signal, the $T_{BLADE}$ signal, and the $T_{CASE}$ signal according to equations (3), (4), (5), wherein terms $T_{prevROTOR}$, $T_{pevBLADE}$, and $T_{prevCASE}$ refer to previous magnitudes of the $T_{ROTOR}$ signal, the $T_{BLADE}$ signal, and the $T_{CASE}$ signal respectively.

$$T_{ROTOR} = T_{prevROTOR} + (T3 - T_{prevROTOR})(1 - e^{-\Delta t/(R\pi ROTOR)}) \quad \text{(Eq. 3)}$$

$$T_{BLADE} = T_{prevBLADE} + (T3 - T_{prevBLADE})(1 - e^{-\Delta t/(R\pi BLADE)}) \quad \text{(Eq. 4)}$$

$$T_{CASE} = T_{prevCASE} + (T3 - T_{prevCASE})(1 - e^{-\Delta t/R\pi CASE)}) \quad \text{(Eq. 5)}$$

Equations (3), (4), and (5) result in a first order lag. A first order lag is preferred in order to minimize complexity. However, any types of functions may be used to generate the $T_{ROTOR}$, the $T_{BLADE}$, and the $T_{CASE}$ signals, including but not limited to functions that result in a lag of any order, a lead of any order, and combinations thereof At a step 210, the magnitudes of the signals $T_{prevROTOR}$, $T_{prevBLADE}$, and $T_{prevCASE}$, are updated.

At a step 212, the processor generates the magnitude of the clearance transient overshoot signal in accordance with equation (2). At a step 214, the processor generates $\Delta$fuel, $\Delta$airflow, $\Delta$CVV$_1$, and $\Delta$CVV$_2$, in accordance with the augmentations schedules described hereinabove with respect to FIG. 5. At a step 216, the processor adds $\Delta$fuel, $\Delta$airflow, $\Delta$CVV$_1$, and $\Delta$CVV$_2$, to the scheduled control signals to generate augmented scheduled control signals as described hereinabove with respect to FIG. 5.

Figure 7:
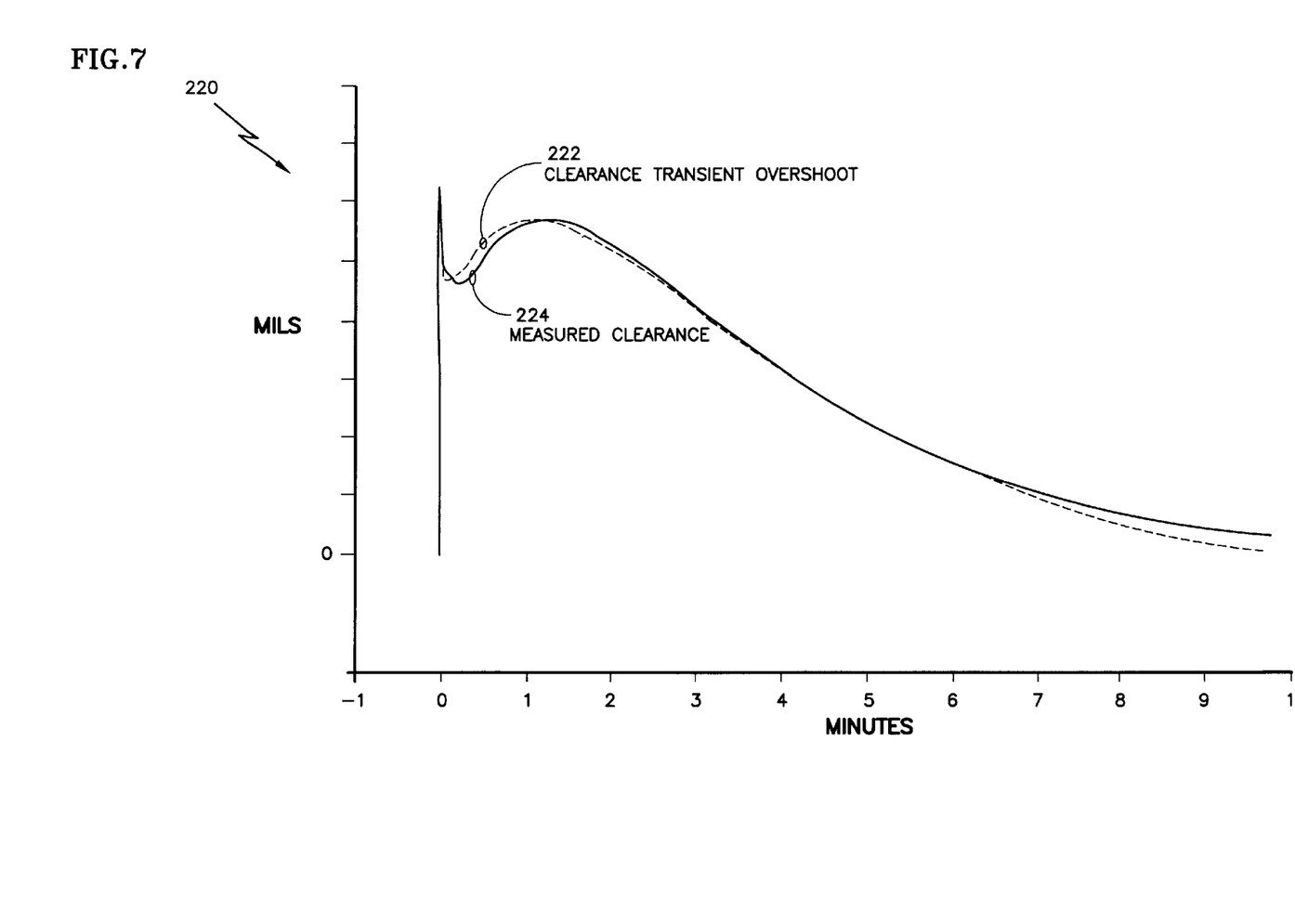
FIG. 7 is a graph illustrating the magnitude of the clearance transient overshoot signal of FIG. 4 and the magnitude of the clearance as measured by a group of laser probes before during and after the rapid transition of FIG. 3.

Referring now to FIG. 7, a graph 220 has a first curve 222 indicative of the magnitude of the clearance transient overshoot signal and a second curve 224 indicative of the instantaneous clearance 60 as measured by a group of laser probes during the rapid transition from the idle engine operating condition to the partial power engine operating condition described with respect to FIG. 3. The close correspondence between the two curves is indicative of the accuracy of the clearance transient overshoot signal, including effects related to the temporary difference that results from a difference between the steady state clearance for the engine operating condition and a steady state clearance for a preceding engine operating condition.

Figure 8:
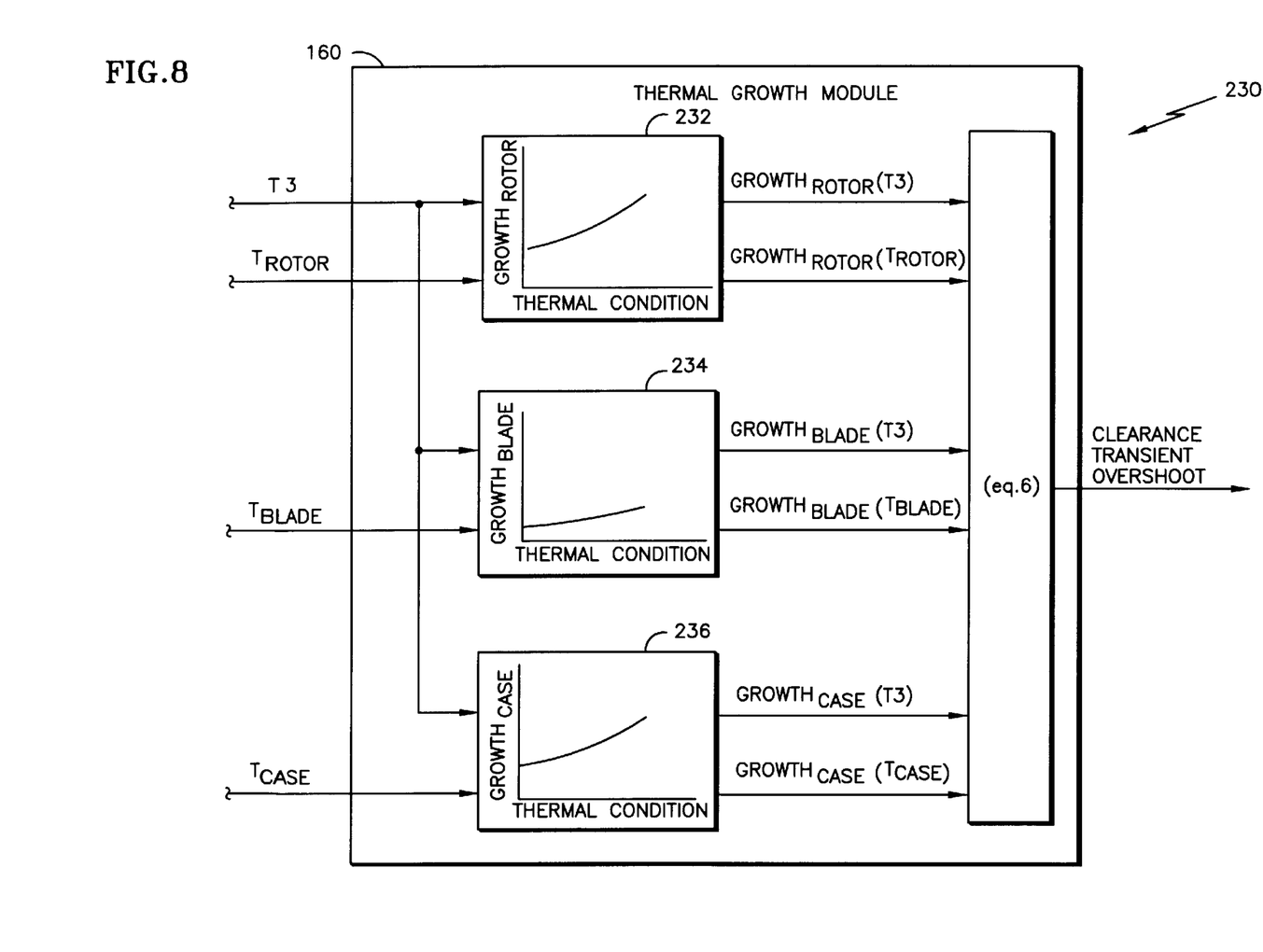
FIG. 8 is a functional block diagram illustrating an alternative embodiment of a thermal growth module of the engine control portion of FIG. 4.

Referring now to FIG. 8, in an alternative embodiment 230, the thermal growth module 160 comprises signals representing three transfer functions: a GROWTH$_{ROTOR}$ transfer function 232, a GROWTH$_{BLADE}$ transfer function 234, and a GROWTH$_{CASE}$ transfer function 236. The transfer functions represent coefficients of thermal expansion of the rotor 52, blades 54, and case 44, respectively. In particular, the GROWTH$_{ROTOR}$ transfer function 232, the GROWTH$_{BLADE}$ transfer function 234, and the GROWTH$_{CASE}$ transfer function 236 relate the thermal conditions represented by the T3, the $T_{ROTOR}$, the $T_{BLADE}$, and the $T_{CASE}$ signals to thermal expansions of the $T_{ROTOR}$, the $T_{BLADE}$, and the $T_{CASE}$, respectively. The transfer functions GROWTH$_{ROTOR}$, GROWTH$_{BLADE}$, and GROWTH$_{CASE}$, are preferably reasonably accurate representations of the characteristics of thermal expansion of the rotor 52, the blade and the case 44 including characteristics related to the structures and/or the materials of the rotor 52, the blades 54 and the case 44.

Each of the transfer functions receives inputs representative of thermal conditions, and in response thereto, generates outputs indicative of thermal expansions associated with the thermal conditions. Thus, the GROWTH$_{ROTOR}$ transfer function 232 receives the T3 signal, and response thereto, generates a signal, GROWTH$_{ROTOR}$(T3), indicative of the thermal expansion of the rotor 52 for the thermal condition represented by the T3 signal. The GROWTH$_{ROTOR}$ transfer function 232 further receives the $T_{ROTOR}$ signal, and in response thereto, generates a signal, GROWTH$_{ROTOR}$($T_{ROTOR}$) indicative of the thermal expansion of the rotor 52 for the thermal condition represented by $T_{ROTOR}$ signal. The GROWTH$_{BLADE}$ transfer function 232 receives the T3 signal, and response thereto, generates a signal, GROWTH$_{BLADE}$(T3), indicative of the thermal expansion of the blades 52 for the thermal condition represented by the T3 signal. The GROWTH$_{BLADE}$ transfer function 232 further receives the $T_{BLADE}$ signal, and in response thereto, generates a signal, GROWTH$_{BLADE}$($T_{BLADE}$) indicative of the thermal expansion of the blades 52 for the thermal condition represented by $T_{BLADE}$ signal. The GROWTH$_{CASE}$ transfer function 232 receives the T3 signal, and response thereto, generates a signal, GROWTH$_{CASE}$(T3), indicative of the thermal expansion of the case 52 for the thermal condition represented by the T3 signal. The GROWTH$_{CASE}$ transfer function 232 further receives the $T_{CASE}$ signal, and in response thereto, generates a signal, GROWTH$_{CASE}$($T_{CASE}$) indicative of the thermal expansion of the case 52 for the thermal condition represented by $T_{CASE}$ signal.

The transfer functions, GROWTH$_{ROTOR}$, GROWTH$_{BLADE}$, and GROWTH$_{CASE}$, may be of any type including a linear type, a nonlinear type, and combinations thereof. The transfer functions may be implemented as a lookup table, an equation, or any other suitable form.

The thermal growth module 160 generates a clearance transient overshoot signal. The clearance transient overshoot signal is indicative of the difference between the instantaneous clearance 60 for the thermal conditions represented by the $T_{ROTOR}$, the $T_{BLADE}$, and the $T_{CASE}$ signals, and the steady-state clearance for the engine operating condition. The clearance transient overshoot signal has a magnitude generated in accordance with equation 6.

$$\begin{aligned}\text{clearance transient overshoot} = \quad & \text{(Eq. 6)}\\ GROWTH_{ROTOR}(T3) - GROWTH_{ROTOR}(T_{ROTOR}) + \\ GROWTH_{BLADE}(T3) - GROWTH_{BLADE}(T_{BLADE}) - \\ (GROWTH_{CASE}(T3) - GROWTH_{CASE}(T_{CASE}))\end{aligned}$$

The term $GROWTH_{ROTOR}(T3)-GROWTH_{ROTOR}(T_{ROTOR})$ represents a difference between the thermal expansion of the rotor 52 at steady state and the thermal expansion of the rotor 52 at the thermal condition represented by the $T_{ROTOR}$ signal. The term $GROWTH_{BLADE}(T3)-GROWTH_{BLADE}(T_{BLADE})$ represents a difference between the thermal expansion of the blades 54 at steady state and the thermal expansion of the blades 54 at the thermal condition represented by the $T_{BLADE}$ signal. The term $GROWTH_{CASE}(T3)-GROWTH_{CASE}(T_{CASE})$ represents a difference between the thermal expansion of the case 44 at steady state and the thermal expansion of the case 44 at the thermal condition represented by the $T_{CASE}$ signal.

The present invention is adaptable to various types of gas turbine engines. Thermal time constants and coefficients of expansion will depend on the particular embodiment. Analysis and/or empirical testing are used to determine suitable thermal time constants and coefficients of expansion. The invention has the flexibility to be finely tuned to the engine based on measurements of the instantaneous clearance during engine testing. A preferred procedure for determining coefficient of expansion is as follows. Select an engine temperature (e.g., T3) to use as a representative working medium gas temperature for the determination of the coefficients of expansion. The representative working medium gas temperature is preferably the same engine temperature as that which is to be used to calculate the clearance transient overshoot signal. Use an analytical thermal model of the rotor assembly 40 and the case 44 to determine initial estimates of the thermal time constants and coefficients of expansion. Perform a plurality of tests representing a plurality of engine acceleration/deceleration operating scenarios. The scenarios should include various initial and various final engine operating conditions under a variety of flight conditions, and should begin with the engine at thermal equilibrium. For example, one scenario begins with thermal equilibrium at a low power engine condition followed by a rapid transition (i.e., snap acceleration) to a military power engine condition. For each scenario, collect data on the reference engine temperature and the instantaneous clearance 60 before, during, and after the scenario. The data will typically include 10 minutes of continuous transient data during thermal stabilization. A laser probe sensor or a capacitive sensor may be used to collect data on the instantaneous clearance. By analyzing the empirical data in view of the description hereinabove with respect to FIG. 3, it is possible to infer which components are doing what when. Calculate, plot and analyze clearance transient overshoot predictions. Compare the empirical data to the predictions. Based on the results of the comparison, adjust the thermal time constants and the thermal expansion coefficients used to generate the clearance transient overshoot signal so as to minimize deviations between the empirical clearance data and clearance transient overshoot signal. In the event that no one solution is optimum for all scenarios, it may be necessary to choose constants and coefficients that are best overall or best in the most critical scenarios. In the alternative, it may be desirable to incorporate features that select constants and coefficients in real time on the basis of the scenario.

If the thermal expansion is a linear function of the change in the reference engine temperature, then a coefficient of expansion may be represented by a single value computed by dividing the expansion by the change in the reference engine temperature. If the expansion is not a linear function of the change in the reference engine temperature, then an average value may be used or alternatively, a transfer function relating the coefficient of expansion to the different thermal equilibrium temperatures for the reference engine temperature may be used. The transfer function may be in the form of an equation or alternatively, a look up table.

Although disclosed with respect to various embodiments for representing coefficients of thermal expansion, the present invention is not limited to such. For example, in another embodiment, the transfer functions $GROWTH_{ROTOR}$, $GROWTH_{BLADE}$, and $GROWTH_{CASE}$, may each receive a single input indicative of a thermal condition and in response generate an output indicative of difference between a thermal expansion at the thermal condition and a thermal expansion at a predetermined thermal condition. Transfer functions of this type may be appropriate where steady state thermal conditions for an engine operating condition can be predetermined.

Moreover, those skilled in the art will recognize that although the processor in the disclosed embodiment comprises programmed hardware, i.e. executed in software by a computer, it may take other forms, including hardwired hardware configurations, hardware manufactured in integrated circuit form, firmware, and combinations thereof. It should be understood that although the disclosed embodiment comprises a digital system with periodically sampled signals, the present invention may also be embodied in an analog system with continuous signals, or a combination of digital and analog systems.

Although disclosed with respect to determining the clearance transient overshoot for three rear compressor stages, the invention is not limited to such. The present invention is suitable for use with both compressors and turbines and may be used for any stage of such.

Furthermore, although disclosed with respect to a best mode embodiment that utilizes a signal indicative of a representative working medium gas temperature, any suitable signal indicative of the engine operating condition may be used. The signal may be a measured indication or a computed one. For example, a representative working medium gas temperature may be determined on the basis of other engine parameters, which themselves may be measured or computed.

Furthermore, although disclosed with respect to a best mode embodiment that determines the difference between the instantaneous clearance and the steady state clearance on the basis of the thermal condition of the rotor, the thermal condition of the blades, and the thermal conditions of the case, the present invention is not limited to such. The determination may be made on the basis of any number of thermal conditions for the rotor assembly and any number of thermal conditions for the case. All that is required for the present invention is at least one thermal condition for the rotor assembly and at least one thermal condition for the case. An appropriate number of thermal conditions for the rotor assembly and an appropriate number of thermal conditions for the case depend on the application. The number of thermal conditions is typically selected so as to result in a desired accuracy in view of the characteristics of the constituent parts of the rotor assembly and the constituent parts of the case. Other embodiments for example may use only one thermal condition for the rotor assembly, or alternatively, more than two thermal conditions for the rotor assembly to represent thermal conditions of, (e.g., the thermal condition of the disk, and the thermal condition of the rim, and the thermal condition of the blades).

Similarly, although disclosed with respect to a best mode embodiment that determines the difference between the instantaneous clearance and the steady state clearance on the basis of the coefficient of thermal expansion of the rotor, the coefficient of thermal expansion of the blades, and the coefficient of thermal expansion of the case, the present invention is not limited to such. The determination may be made on the basis of any number of coefficient of thermal expansion for the rotor assembly and any number of coefficients of thermal expansion for the case. All that is required for the present invention is at least one coefficient of thermal expansion for the rotor assembly and at least one coefficient of thermal expansion for the case. The number of coefficients of thermal expansion for the rotor assembly and the number of coefficients of thermal expansion for the case typically but not necessarily correspond with the number of thermal conditions of the rotor assembly and the number of thermal conditions of the case, respectively. As with the number of thermal conditions described above, the number of coefficients of thermal expansion is typically selected so as to result in a desired accuracy in view of the characteristics of the constituent parts of the rotor assembly and the constituent parts of the case.

While the present invention has been described with reference to a best mode embodiment, this description is not meant to be construed in a limiting sense. Various modifications of the best mode embodiment, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. An apparatus for use with a gas turbine engine having a rotor assembly and a case, the rotor assembly having a rotor and a plurality of blades circumferentially spaced about and attached to the rotor, the blades being spaced apart from the case by a clearance, the gas turbine engine having an engine operating condition and a signal is provided indicative thereof, the apparatus comprising:

first processing means, responsive to the signal indicative of the engine operating condition, for generating at least one signal representative of at least one thermal condition of the rotor assembly and at least one signal representative of at least one thermal condition of the case;

second processing means responsive to the signal indicative of the engine operating condition, the at least one signal representative of the at least one thermal condition of the rotor assembly and the at least one signal representative of the at least one thermal condition of the case, for generating a signal indicative of a difference between an instantaneous clearance for the at least one thermal condition of the rotor assembly and the at least one thermal condition of the case and a clearance at steady state thermal conditions for the rotor assembly and the case for the engine operating condition.

2. The apparatus of claim 1 wherein the second processing means further comprises means for providing at least one signal representative of at least one coefficient of thermal expansion of the rotor assembly and at least one signal representative of at least one coefficient of thermal expansion of the case, and for generating the signal indicative of the difference between the instantaneous clearance and the steady state clearance with a magnitude determined as a function of thereof.

3. The apparatus of claim 2 wherein the second processing means further comprises means for determining the steady state thermal expansion of the rotor assembly as a function of the signal indicative of the engine operating condition and the at least one signal representative of the at least one coefficient of thermal expansion of the rotor assembly, and means for determining the steady state thermal expansion of the case as a function of the signal indicative of the engine operating condition and the at least one signal representative of the at least one coefficient of thermal expansion of the case.

4. The apparatus of claim 3 wherein at least one of the at least one signal representative of the at least one coefficient of thermal expansion of the rotor assembly and the at least one signal representative of the at least one coefficient of thermal expansion of the case, is of a type comprising at least one of a look up table and an equation.

5. The apparatus of claim 1 wherein the signal indicative of the engine operating condition is a signal indicative of a temperature of a working medium gas of the engine.

6. The apparatus of claim 1 wherein the second processing means further comprises means for generating the at least one signal representative of the at least one thermal condition of the rotor with a magnitude that is equal to that of the signal indicative of the engine operating condition when the rotor assembly is at thermal equilibrium for the engine condition, and means for generating the at least one signal representative of the at least one thermal condition of the case with a magnitude that is equal to that of the signal indicative of the engine operating condition when the case is at thermal equilibrium for the engine condition.

7. The apparatus of claim 1 wherein the at least one signal representative of the at least one thermal condition of the rotor assembly includes a signal representative of a thermal condition of the rotor and a signal representative of a thermal condition of the blades.

8. The apparatus of claim 2 wherein the signal indicative of the engine operating condition is a signal indicative of a temperature of a working medium gas of the engine, the second processing means further comprises means for determining the steady state thermal expansion of the rotor as a function of the signal indicative of the engine operating condition and the at least one signal representative of the at least one coefficient of thermal expansion of the rotor assembly, means for determining the steady state thermal expansion of the case as a function of the signal indicative of the engine operating condition and the at least one signal representative of the at least one coefficient of thermal expansion of the case, means for generating the at least one signal representative of the at least one thermal condition of the rotor assembly with a magnitude that is equal to that of the signal indicative of the engine operating condition when the rotor is at thermal equilibrium for the engine condition, and means for generating the at least one signal representative of the at least one thermal condition of the case with a magnitude that is equal to that of the signal indicative of the engine operating condition when the case is at thermal equilibrium for the engine condition.

9. The apparatus of claim 8 wherein the at least one signal representative of the at least one thermal condition of the rotor assembly includes a signal representative of a thermal condition of the rotor and a signal representative of a thermal condition of the blades.

10. A method for use with a gas turbine engine having a rotor assembly and a case, the rotor assembly having a rotor and a plurality of blades circumferentially spaced about and attached to the rotor, the blades being spaced apart from the case by a clearance, the gas turbine engine having an engine operating condition and a signal is provided indicative thereof, the method comprising:

generating in response to the signal indicative of the engine operating condition, at least one signal representative of at least one thermal condition of the rotor assembly, and at least one signal representative of at least one thermal condition of the case; and generating a signal indicative of a difference between an instantaneous clearance for the at least one thermal conditions of the rotor assembly, the blades, and the at least one thermal condition of the case and a clearance at steady state thermal conditions for the rotor assembly, and the case for the engine operating condition, in response to the signal indicative of the engine operating condition, the at least one signal representative of the at least one thermal condition of the rotor assembly, and the at least one signal representative of the at least one thermal condition of the case.

11. The method of claim 10 further comprising providing at least one signal representative of at least one coefficient of thermal expansion of the rotor assembly, and at least one signal representative of at least one coefficient of thermal expansion of the case, and generating the signal indicative of the difference between the instantaneous clearance and the steady state clearance with a magnitude determined as a function thereof.

12. The method of claim 11 further comprising determining the steady state thermal expansion of the rotor assembly as a function of the signal indicative of the engine operating condition and the at least one signal representative of the at least one coefficient of thermal expansion of the rotor assembly, and determining the steady state thermal expansion of the case as a function of the signal indicative of the engine operating condition and the at least one signal representative of the at least one coefficient of thermal expansion of the case.

13. The method of claim 12 wherein at least one of the at least one signal representative of the at least one coefficient of thermal expansion of the rotor assembly, and the at least one signal representative of the at least one coefficient of thermal expansion of the case, is of a type comprising at least one of a look up table and an equation.

14. The method of claim 10 wherein the signal indicative of the engine operating condition is a signal indicative of a temperature of a working medium gas of the engine.

15. The method of claim 10 further comprising generating the at least one signal representative of the at least one thermal condition of the rotor assembly with a magnitude that is equal to that of the signal indicative of the engine operating condition when the rotor assembly is at thermal equilibrium for the engine condition, and generating the at least one signal representative of the at least one thermal condition of the case with a magnitude that is equal to that of the signal indicative of the engine operating condition when the case is at thermal equilibrium for the engine condition.

16. The method of claim 10 wherein the at least one signal representative of the at least one thermal condition of the rotor assembly includes a signal representative of a thermal condition of the rotor and a signal representative of a thermal condition of the blades.

17. The method of claim 11 wherein the signal indicative of the engine operating condition is a signal indicative of a temperature of a working medium gas for the engine condition, and further comprising determining the steady state thermal expansion of the rotor as a function of the signal indicative of the engine operating condition and the at least one signal representative of the at least on coefficient of thermal expansion of the rotor assembly, determining the steady state thermal expansion of the case as a function of the signal indicative of the engine operating condition and the at least one signal representative of the at least one coefficient of thermal expansion of the case, generating the at least one signal representative of the at least one thermal condition of the rotor assembly with a magnitude that is equal to that of the signal indicative of the engine operating condition when the rotor assembly is at thermal equilibrium for the engine condition, and generating the at least one signal representative of the at least one thermal condition of the case with a magnitude that is equal to that of the signal indicative of the engine operating condition when the case is at thermal equilibrium for the engine condition.

18. The method of claim 17 wherein the at least one signal representative of the at least one thermal condition of the rotor assembly includes a signal representative of a thermal condition of the rotor and a signal representative of a thermal condition of the blades.

* * * * *